Sept. 29, 1942.  G. A. LENNHOLM ET AL  2,297,626

VALVE OPERATING ELECTROMAGNET

Filed Feb. 10, 1940

INVENTORS.
Gustav A. Lennholm,
BY George H. Clark.
Myron J. Sib[...]
ATTORNEY

Patented Sept. 29, 1942

2,297,626

UNITED STATES PATENT OFFICE 2,297,626

VALVE OPERATING ELECTROMAGNET

Gustav A. Lennholm, Detroit, and George H. Clark, Washtenaw County, Mich., assignors to Square D Company, Detroit, Mich., a corporation of Michigan Application February 10, 1940, Serial No. 318,259

3 Claims. (Cl. 175—341)

This invention relates to electro-magnetically operated valves of the type known as "solenoid valves" and has for its object the provision of an improved and economical form of valve of this type which shall have increased operating force with lower energy input and which shall have improved and reliable operating characteristics.

Other objects and features of this invention will be readily apparent to those skilled in the art from the specification and appended drawing illustrating certain preferred embodiments in which.

Figure 1:
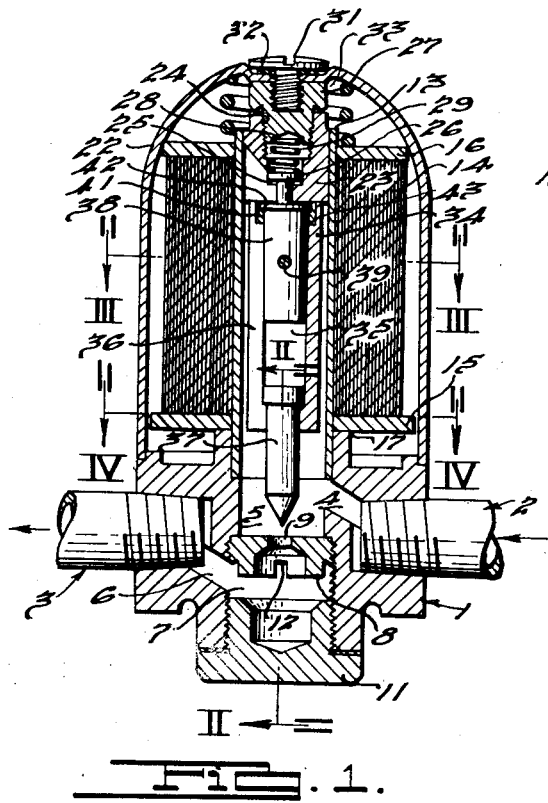
Figure 1 is a vertical sectional view of the solenoid valve according to the present invention.
Figure 2:
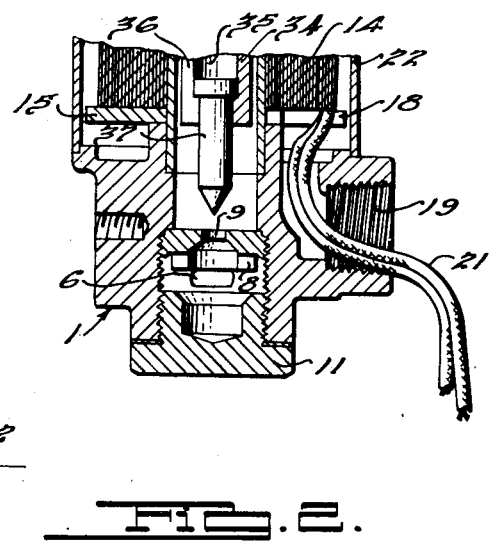
Figure 2 is a fragmentary sectional view taken on the line II—II of Figure 1.
Figures 3, 4:
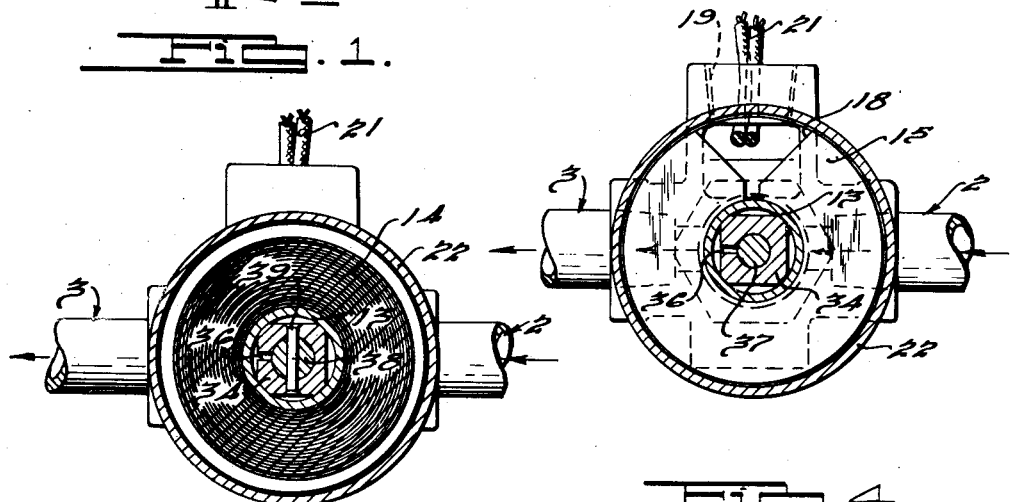
Figure 3 is a sectional view taken on the line III—III of Figure 1.
Figure 4 is a sectional view taken on the line IV—IV of Figure 1.

The valve is illustrated in its energized or open position and comprises a valve casing 1 having an inlet connection 2 and an outlet connection 3, with communicating passages 4 and 6 and with a valve chamber 5 and a chamber 7 therebetween. A bushing 8 threadedly secured within the casing 1 between valve chamber 5 and chamber 7 carries a valve seat 9. A sealing cap 11 is threaded into the casing 1 beneath the bushing 8 and is removable to permit access and removal of the bushing which is cross slotted as at 12 for cooperation with a suitable tool for ease in assembling and removing.

A non-magnetic tube 13 is fitted into an opening in the top of casing 1 and is rigidly secured thereto as by soldering or brazing. An energizing coil 14 is disposed about the tube 13, with a pair of magnetic washers 15 and 16 disposed about the tube at the top and bottom of the coil. The lower washer 15 is supported upon an annular seat 17 provided by the casing, and, in turn, supports coil 14. An opening 18 in washer 15 cooperates with an opening 19 in casing 1 to permit the passage of the lead-in wires 21 for the energizing coil. A cover 22 of magnetic material overlaps the valve casing 1 and rests upon an annular seat provided at the exterior thereof. Rigidly secured as by soldering within the upper portion of tube 13 is a plug member 23 having a longitudinal passage 24 of varying widths therethrough. Supported upon an annular seat 25 provided in the plug 23 near the lower extremity of passage 24 is a kickoff pin 26 having a portion thereof adapted to extend beyond the bottom face of the plug. A stud 27 is threaded into the top of the plug 23 and is provided with a spring seat 28 in its lower face. Disposed between the spring seat 28 and the head of the kickoff pin 26 is a spring 29 biasing the head of said pin continually toward the annular seat 25. The stud 27 is interiorly threaded at the top thereof to receive a holding screw 31 to secure the cover 22 in position. A lock washer 32 is disposed between the head of the screw 31 and the cover 22 within an indentation in said cover. Disposed between the cover 22 and the upper magnetic washer 16 is a spring 33 exerting its bias to securely hold the washers 15 and 16 and the coil 14 in assembled position.

A magnetic plunger core or armature 34 having a bore 35 extending longitudinally therethrough is disposed within the tube 13 and is reciprocably movable therein upon energization and de-energization of the coil 14. A longitudinal slot 36 is provided upon the core 34 to reduce the eddy current losses therein. A valve pin 37 is movably disposed within the bore 35 with its end portion extending through an opening in the bottom of the core. This construction provides a lost motion connection between the core and the valve pin. The valve pin 37 is tapered at its lower end to cooperate with valve seat 9 to close the valve when the coil 14 is deenergized. Upon energization of the coil, the core 34 will start to move upwardly but the valve pin 37 will not immediately follow because of the lost motion connection. Continued movement of the core causes the inner bottom face of the core 34 to strike the valve pin head with a hammerlike blow to thereby quickly pull the valve pin from its seat. The provision of this hammer action prevents sticking of the valve, insures a tight seat and will open the valve against high pressures.

Within the upper portion of the hollow core 34 is disposed a stop pin 38 rigidly secured in place as by a rivet 39. A shading coil 41 is also carried by the core at its upper end, being held in place beneath the head 42 of stop pin 38 and within an annular seat 43 in the core. Due to the reversal in direction of alternating current twice during each cycle, the holding force exerted upon the core 34 will vary from maximum to zero during each half cycle. When the force is zero, the armature 34 will start to drop, but the zero period is so short that the armature falls but a very short distance before the building up to maximum increases the magnetic flux sufficiently to carry the armature upward again, the rapid repetitions of this slight downward and upward movement tending to create unpleasant vibrations and objectionable noises. To obviate these disadvantages, the shading oil 41 is provided. The alternating flux produced by the electromagnetic coil 14 induces a secondary current in the shading coil—a current out of phase with the primary current of the electromagnetic coil—and thereby induces a secondary flux which lags behind the primary flux; when the primary flux is zero the secondary flux is at its maximum so that there is at all times a holding force exerted upon the armature 34.

To lessen the amount of residual magnetism in the core and thus lessen the possibility of sticking after deenergization, the exterior face of stop pin 38 is shown disposed a very slight distance below the upper rim of core 34—1/5000 of an inch having been found sufficient in practice—to create an air gap between the bottom face of the plug member 23 and the upper face of the core and consequent lessening of residual magnetic force. To further lessen the possibility of sticking, the kick off pin 26 above described has been furnished. The combination of this kick off pin and its cooperating spring 29 provides sufficient force to overcome the holding force of any residual magnetism that may be present and insures the downward movement of the core 34 after deenergization of the electromagnetic coil 14.

While certain preferred embodiments of this invention have been specifically disclosed, it is understood that the invention is not limited thereto, as many variations will be readily apparent to those skilled in the art and the invention is to be given its broadest possible interpretation within the terms of the following claims.

What is claimed is:

1. In a device of the class described, an energizing coil, a core mounted therein, a magnetic plug fixedly mounted within one end of said coil with which the core can engage, a movable element spring biased in the direction of the deenergized position of said core, a stop member carried by said core and disposed a slight distance from the plane of the upper core rim to reduce the area of contact between the core and plug and thereby the retention of residual magnetism, said upper core rim being the only core surface in contact with the magnetic plug, said stop member being engageable by said movable element to prevent possible sticking of the core in its energized position due to residual magnetism after deenergization.

2. In a device of the class described, an energizing coil having a passage extending therethrough, a sleeve member fitted within said passage, a magnetic plug fixedly mounted within one extremity of said sleeve member, a movable return pin carried by said magnetic plug and continually biased toward one position, a core slidably fitted in said sleeve member and having a portion thereof extending beyond the lower rim of said member, and adapted to be moved therein upon energization of the coil, a stop member carried at the other extremity of said core and disposed a slight distance from the plane of the upper core rim to reduce the area of contact between the core and plug and thereby the retention of residual magnetism, said upper core rim being the only core surface in contact with the magnetic plug said stop member being engageable by said return pin to prevent possible sticking of the core in its upper position due to residual magnetism after deenergization.

3. In a device of the class described, an energizing coil having a passage therethrough, a nonmagnetic tube extending therein, a magnetic plug having a longitudinal passage therethrough fixedly mounted within the upper portion of said tube, a stud threaded into the top of said magnetic plug, a kickoff pin supported within said longitudinal passage and movable therein, a spring disposed between said stud and said kickoff pin to continuously bias it toward one position, a pair of magnetic plates disposed at either end of said coil, an armature slidably fitted in said tube, a longitudinal slot in said armature to interrupt eddy current paths in the armature, a shading coil carried by said armature at the upper end thereof and disposed between the head of a stop member and an annular seat provided by the armature, said stop member being spaced from the plane of the upper rim of said armature to reduce the area of contact between the armature and plug to create an air gap to thereby lessen the retention of residual magnetism, said upper armature rim being the only armature surface in contact with the magnetic plug, said kickoff pin operating to prevent possible sticking of the armature in its upper position due to residual magnetism after deenergization, an enclosing cover for the device and a holding stud threadedly received by said first mentioned stud to secure said cover in place.

GUSTAV A. LENNHOLM.
GEORGE H. CLARK.